United States Patent [19]

Jelaca

[11] 4,291,595

[45] Sep. 29, 1981

[54] GAS SAVING TRANSMISSION

[75] Inventor: Svetozar Jelaca, Los Angeles, Calif.

[73] Assignee: George Luburich, Arlington Heights, Ill. ; a part interest

[21] Appl. No.: 8,887

[22] Filed: Feb. 2, 1979

Related U.S. Application Data

[63] Continuation-in-part of Ser. No. 894,484, Apr. 10, 1978, abandoned.

[51] Int. Cl.³ .............................................. B60K 41/16
[52] U.S. Cl. ....................................... 74/863; 74/867; 74/856; 74/645
[58] Field of Search ................. 74/863, 864, 867, 868, 74/869, 856, 645

[56] References Cited

U.S. PATENT DOCUMENTS

| | | | |
|---|---|---|---|
| 2,761,328 | 9/1956 | Herndow et al. | 74/645 X |
| 2,763,162 | 9/1956 | Herndow | 74/645 |
| 3,688,606 | 9/1972 | Lemieux et al. | 74/863 |
| 3,699,994 | 10/1972 | Mohri | 74/863X |
| 4,023,442 | 5/1977 | Woods et al. | 74/863 |

*Primary Examiner*—H. Hampton Hunter
*Attorney, Agent, or Firm*—McWilliams, Mann & Zummer

[57] ABSTRACT

A control system for an automatic transmission for vehicles which eliminates the torque convertor and incorporates a flow proportioning valve arrangement to proportion the flow of pressure fluid from the pressure source between sump and the drive condition determining servos in accordance with the manifold vacuum pressure of the vehicle engine, the flow to the servos increasing as manifold vacuum pressure decreases. The arrangement is operative to disconnect the transmission output from the vehicle engine when there is insufficient engine torque to match the load imposed on the system. The flow proportioning valve is responsive to engine manifold vacuum pressure and governor fluid pressure which is proportional to the speed of the vehicle.

8 Claims, 4 Drawing Figures

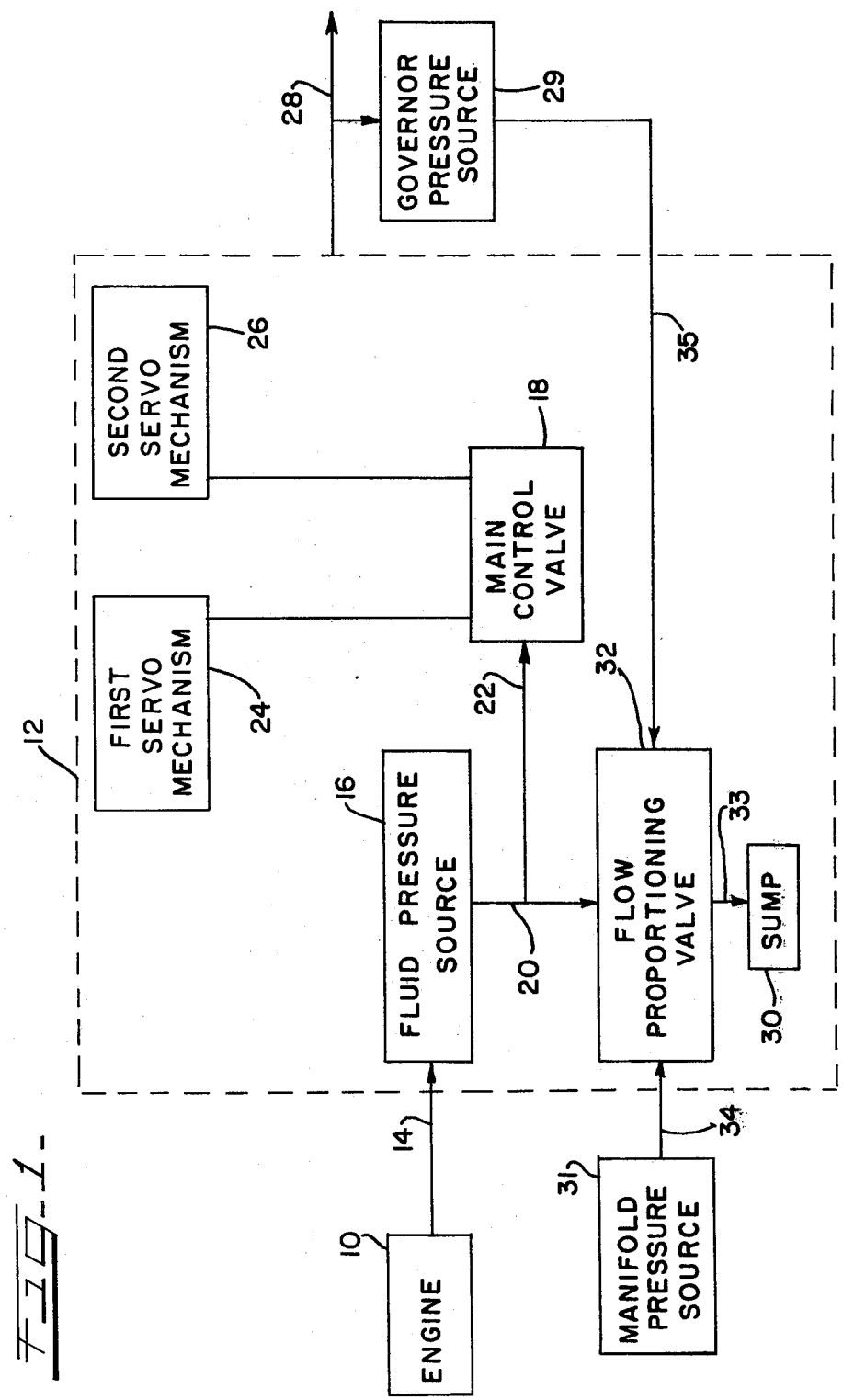

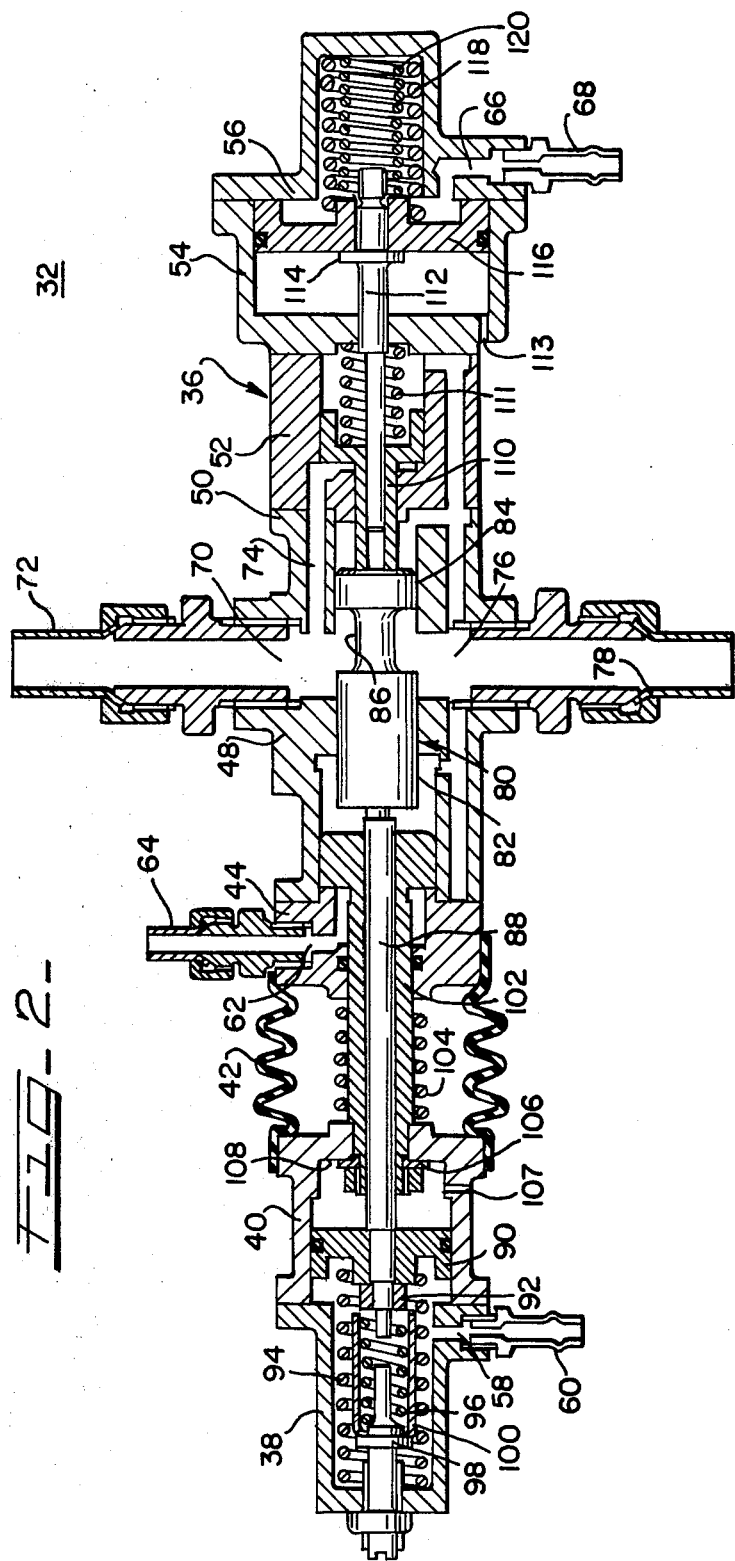

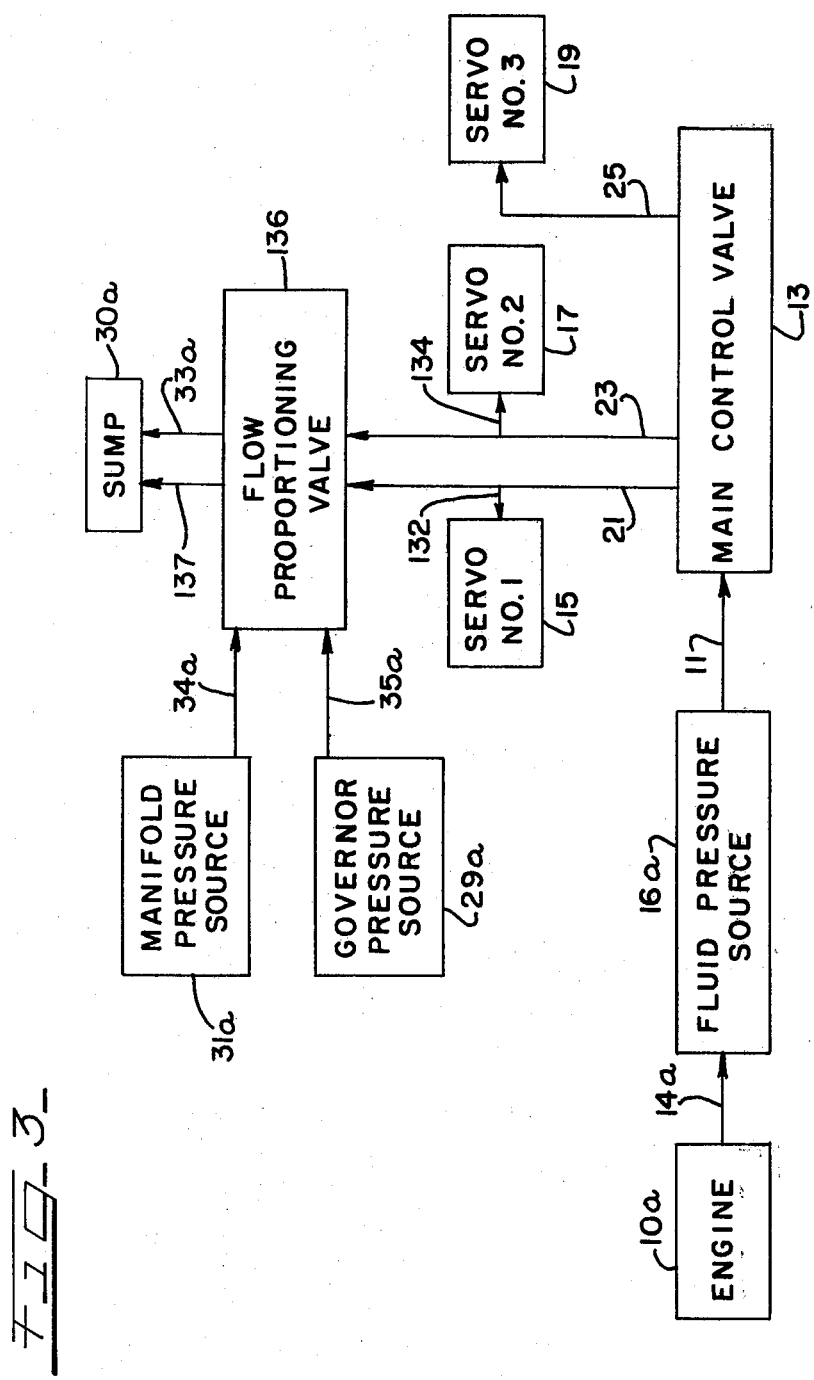
FIG_3

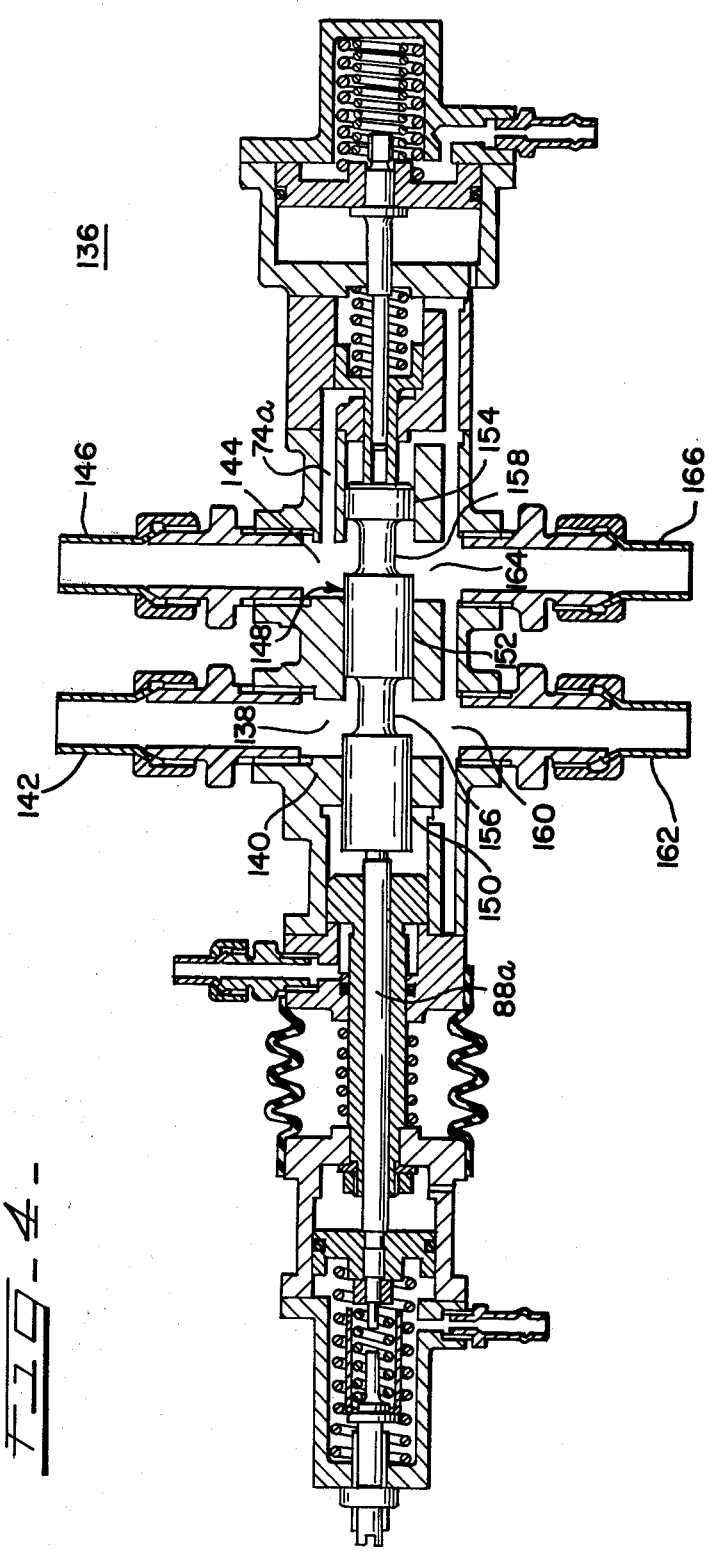

GAS SAVING TRANSMISSION

CROSS REFERENCE TO RELATED APPLICATIONS

The present application is a continuation in part of Application Ser. No. 894,484 filed Apr. 10, 1978, now abandoned.

BACKGROUND OF THE INVENTION

In the prior art, fluid coupling arrangements have been provided for transmitting the rotational energy of an automotive vehicle's engine output shaft to the input shaft of the vehicle's automatic power transmission. Typical of these arrangements have been the torque convertors. All of these arrangements have presented definite problems with respect to power loss, fuel waste, and general inefficiency in energy conversion and power transmission.

Without some slippage in the connection between the vehicle's power source and power transmission, at low engine speed and vehicle speed, engine torque would be insufficient to overcome the load imposed by the inertia of the vehicle and its contents. Thus, the engine would be unable to move the vehicle from a standstill or to stop the vehicle, either in forward or reverse gear, smoothly and without stalling.

Slippage is always present in a fluid coupling, to some degree. This is because there is no direct mechanical linkage between the engine's output shaft and the transmission's input shaft. This everpresent slippage results in a loss of power, the degree of which may vary with the engine speed, vehicle load and other factors. Coincident with this power loss is a waste of fuel. Due to the increasing scarcity and rising cost of petroleum products this fuel waste is a critical factor to be considered.

SUMMARY OF THE INVENTION

The present invention eliminates the torque convertor of prior art transmissions and provides an arrangement which is operative to directly couple the engine output shaft to the input shaft of the vehicle's automatic power transmission. A proportioning valve arrangement responsive to manifold vacuum pressure and output shaft speed is provided between the pump and the servo members for varying the flow to the servos in accordance with manifold vacuum pressure. Initially, at idle, the proportioning valve will direct substantially all fluid from the pressure source to sump effectively disconnecting the engine from the drive shaft. As engine speed increases, manifold vacuum pressure decreases which causes the flow proportioning valve to direct a greater portion of the fluid pressure to the servos. When the vehicle reaches a predetermined speed, governor pressure overrides the effect of the manifold vacuum pressure causing the proportioning valve to assume a position directing all of the fluid flow from the pressure source to the servos. Thus, the present invention, by elimination of the torque convertor and its inherent inefficiencies results in a transmission which produces greatly increased efficiency of power tramsmission and dramatically reduces the energy wasted by prior art devices of this type.

BRIEF DESCRIPTION OF THE DRAWINGS

FIG. 1 represents in schematic form the overall engine-transmission system with flow proportioning valve situated between the fluid pressure source and main control valve.

FIG. 2 is a cross-sectional view of the flow proportioning valve schematically represented in FIG. 1.

FIG. 3 represents in schematic form a modified embodiment of the overall engine-transmission system with the flow proportioning valve situated between the main control valve and the servo mechanisms.

FIG. 4 is a cross-sectional view of the flow proportioning valve schematically represented in FIG. 3.

DESCRIPTION OF THE EMBODIMENT ILLUSTRATED IN FIGS. 1 AND 2

FIG. 1 shows a schematic representation of a typical engine-transmission system for a vehicle, with an internal combustion engine 10, and a hydraulically operated automatic transmission 12, of the general type shown in U.S. Pat. No. 2,763,162. An input shaft 14 provides a direct mechanical connection between the engine 10 and the transmission 12. The input shaft 14 drives a fluid pressure source 16, normally a hydraulic pump, which provides hydraulic fluid pressure to a main control valve 18 by means of hydraulic lines 20 and 22. The structure and function of the main control valve 18 are well known in the art particularly as illustrated in U.S. Pat. No. 2,761,328. The control valve 18 is operated in manual fashion, by means of a gear shift selector, or automatically, by means of control inputs based on load, engine speed, accelerator position, etc. The main control valve directs hydraulic fluid pressure to one or both of a pair of servo mechanisms 24 and 26 which determine the drive condition of the transmission.

An output shaft 28 is connectable to the vehicle drive shaft (not shown) to provide driving torque for the vehicle. A governor pressure source 29 is shown driven by the output shaft 28 and is normally a hydraulic pump, which provides a fluid pressure which varies with the rotational speed of said output shaft. A sump 30 is provided from which fluid is taken by the intake suction of the fluid pressure source 16. A manifold vacuum pressure source 31 transmits a fluid pressure equal to that of the vacuum in the engine intake manifold. A flow proportioning valve 32 diverts fluid pressure in varying amounts from hydraulic line 20 to the sump 30 through hydraulic line 33. Line 34 connects the manifold vacuum pressure source 31 to the proportioning valve 32 and line 35 connects the governor pressure source 29 to the flow proportioning valve 32.

FIG. 2 shows a cross-sectional view of the flow proportioning valve 32 contained within housing 36, which is an assemblage of housing parts 38, 40, 44, 48, 50, 52, 54 and 56, and dust cover 42. Vent 107 is disposed within housing part 40. An inlet port 58 is provided in housing part 38 connected to a fitting 60 to communicate with line 34. An inlet port 62 in housing part 44 is connected to a fitting 64 to communicate with line 38. An inlet port 66, in housing part 56, is connected to a fitting 68 to communicate with line 34. An inlet port 70 in housing part 48 is connected to a fitting 72 to communicate with line 20. A fluid passage 74 is interposed in housing part 48 to transmit the fluid pressure from inlet port 70. An outlet port 76 in housing part 48 is opposite port 70 and connected to a fitting 78 to communicate with line 33.

A spool valve 80 is slidably disposed within housing 36, formed of lands 82 and 84 separated by an intermediate area 86 and includes an extension 88. Connected to the extension are piston 90 and annular stop 92. Piston 90 is acted on by resilient member 94, shown as a coil spring, abutting housing part 38. Annular stop 92 is adapted to engage spring 96 held in place by abutment 98 and spring housing 100. A sleeve 102 is coaxially mounted around extension 88 and a spring 104 is located between housing parts 40 and 44, mounted around sleeve 102. An annular stop 106 is provided, fixed about the end of sleeve 102 and abutting surface 108 of housing part 40. A piston 110 abuts resilient member 111, both of which are coaxially mounted on a piston actuator 112 consisting of a linearly extending member and an outwardly extending flange 114 abutting piston 116. The piston 116 is slidably disposed within housing part 54 compressing resilient members 118 and 120. Vent 113 is disposed within housing part 54.

OPERATION OF THE EMBODIMENT ILLUSTRATED IN FIGS. 1 AND 2

In the operation of a motor vehicle wherein power is provided by the engine-transmission combination described in FIG. 1, the operator first moves the manual gear selector from either the park or neutral position to one of the forward or reverse drive positions. In this configuration, with the input shaft 14 turning at a relatively low rotational speed, the pressure provided by the fluid pressure source 6 is of a low order. Since the vehicle is at a standstill, the output shaft 28 is not rotating, and hence, the pressure provided by the governor pressure source 29 is zero. The engine manifold vacuum pressure in this configuration is of a high order, and this same high vacuum would be present within the cavity formed by housing parts 38 and 40 and piston 90. Atmospheric pressure would be present in the cavity within housing part 40, to the right of piston 90, such pressure having been introduced by vent 107. The combined forces of atmospheric pressure and high vacuum pressure, multiplied by the areas of the respective opposite sides of piston 90, overcome the biasing forces of resilient members 94 and 96, thus biasing spool valve 80 to the left as shown in FIG. 2. The fluid pressure from the fluid pressure source 16 will therefore flow substantially unimpeded through the flow proportioning valve 32 to sump 30 with little or no fluid pressure to main control valve 18 or servo mechanisms 24 and 26. Thus, the system acts so as to uncouple the transmission input 14 from the output 28.

As the throttle of the engine is opened, the engine manifold vacuum decreases, and the pressure from the fluid pressure source 16 increases. As the manifold vacuum pressure decreases, the combined force of atmospheric pressure on the right side of piston 90 and vacuum pressure on the left side of piston 90 is lessened, so that these forces no longer overcome the biasing forces of resilient means 94 and 96, which move the spool valve 90 to the right as shown in FIG. 2. As the fluid pressure from source 16 increases and passes through fitting 72 inlet port 70 and fluid passage 74 it exerts force on piston sleeve 110, thus overcoming the bias of resilient member 111, and thereby allowing for easier passage of spool valve 80 to the right and on to its fully closed position. As the spool valve 80 beings to close, fluid pressure from fluid pressure source 16 will be increasingly impeded and will flow to servo mechanisms 24 and 26 increasingly rather than to sump 30. Thus, the system acts so as to engage the transmission input 14 and output 28 gradually, so that the engine can build up speed, and thus, torque, without stalling.

During the normal vehicle operation just described, a vacuum equal to the engine manifold vacuum would be present within the cavity formed by housing part 56 and piston 116. Atmospheric pressure from vent 113 would be present in the cavity formed by housing part 54 and piston 116. The combined forces of atmospheric pressure and vacuum pressure, multiplied by the areas of the respective opposite sides of piston 116 are sufficient to overcome the biasing forces of resilient members 118 and 120 except when the engine manifold vacuum pressure is very low.

When greater than normal load is placed on the vehicle, such as a steep uphill gradient, it is necessary for the engine 10 to build up higher speed and torque quickly to match the increased load. As the engine speed increases quickly due to a wide throttle opening, engine manifold vacuum drops quickly, to a very low value. In this configuration, the biasing forces of resilient members 118 and 120 will overcome the combined forces acting on piston 116 by atmospheric pressure within housing part 54 and manifold vacuum within housing part 56, thus moving valve actuator 112 to the left as shown in FIG. 2.

This action will retard the opening of spool valve 80, thus allowing fluid pressure from source 16 to flow through flow proportioning valve 32 to sump 30 rather than to servo mechanisms 24 and 26. In this manner slippage between transmission input 14 and output 28 is maintained long enough for the engine 10 to develop higher than normal torque to match the higher than normal load placed on the system.

As the vehicle reaches higher speeds, it is desirable to eliminate slippage in the system. As the rotational speed of the output shaft 28 increases, the pressure from the governor pressure source 29 increases and exerts force on sleeve 102, which moves sleeve 102, annular stop 106 and housing parts 40 and 38 to the right, compressing resilient member 104, and dust cover 42. This action exerts force against piston 90 and, in turn, against extension 88 of spool valve 80, moving spool valve 80 to the right, thereby closing it as the vehicle reaches some predetermined speed. (For example, 25 miles per hour). Accordingly, all fluid pressure from source 16 flows directly to main control valve 18 and then to servo mechanisms 24 and 26 resulting in a direct mechanical connection between input shaft 14 and output shaft 28 thereby eliminating slippage and the inherent inefficiency connected with it. This acts as an override to prevent fluctuations in engine manifold pressure from effecting slippage within the system once the vehicle is moving at a given speed.

DESCRIPTION OF THE EMBODIMENT ILLUSTRATED IN FIGS. 3 AND 4

FIG. 3 shows a schematic representation of a modified embodiment of the present invention. In FIGS. 3 and 4 components identical to those shown in FIGS. 1 and 2 are given identical identifying numerals with the addition of the suffix "a".

In FIG. 3, the fluid pressure source 16a communicates directly with a main control valve 13 by transmission of fluid pressure through line 11.

Fluid lines 21 and 23 connect main control valve 13 and flow proportioning valve 136. A pair of servo mechanisms 15 and 17 are connected to lines 21 and 23 by lines 132 and 134 respectively. A third servo mechanism 19 is connected to the main control valve 13 by fluid line 25. The flow proportioning valve communicates with sump 30a through lines 33a and 137. Thus, in this embodiment the flow proportioning valve is disposed between the main control valve and the servos whereas in the embodiment shown in FIGS. 1 and 2 the flow proportioning valve is disposed between the fluid pressure source and the main control valve.

FIG. 4 shows a cross-sectional view of the flow proportioning valve 136. A fluid pressure inlet port 138 in housing part 140 communicates with fitting 142 to receive fluid pressure from line 21. A second fluid pressure inlet port 144 in housing part 140 communicates with fitting 146 to receive fluid pressure from line 23.

A spool valve 148 is slidably disposed within the housing, formed of lands 150, 152 and 154, with lands 150 and 152 separated by intermediate area 156, and lands 152 and 154 separated by intermediate area 158.

An outlet port 160 in housing part 140 communicates with fitting 162 to transmit fluid pressure to line 133. A second outlet port 164 in housing part 140 communicates with fitting 166 to transmit fluid pressure to line 33a.

OPERATION OF THE EMBODIMENT ILLUSTRATED IN FIGS. 3 AND 4

In the embodiment of FIG. 3, fluid pressure from the fluid pressure source 16a is always delivered to the main control valve 13. Thus, internal lubrication is provided to the main control valve operating system. The only servo mechanisms affected by the operation of the flow proportioning valve are servo mechanisms 15 and 17, since they are the servo mechanisms which govern the behavior of the transmission at low speed in forward and reverse gears.

The operation of the flow proportioning valve 136 is the same as that of flow proportioning valve 32, the only differences in the valves being the replacement of a single spool valve arrangement with a double spool valve arrangement, to divert fluid pressure from two servo mechanisms rather than from one main control valve.

What is claimed is:

1. A control system for a transmission having an input shaft, an output shaft, a fluid pressure source driven by said input shaft, and a plurality of fluid pressure responsive servo members for determining the drive condition of the transmission, said control system including flow proportioning valve means disposed between said fluid pressure source and said servo members and in communication with a manifold pressure source and a sump, operative to vary the fluid flow from said fluid pressure source between said servo members and said sump in relation to said manifold pressure, said flow from said pressure source to said servo members increasing as manifold vacuum pressure decreases, and means for providing a governor pressure which varies directly with the rotational speed of said output shaft and means connecting said governor pressure to said flow proportioning valve means whereby, when said output shaft has reached a predetermined rotational speed, said governor pressure overrides the effect of said manifold vacuum pressure to allow substantially all of said fluid pressure to be directed from said fluid pressure source to said servo members.

2. A control system as in claim 1 including a fluid passage defined internal to said flow proportioning valve means in communication with said pressure source operative to urge said flow proportioning valve toward a closed position so as to direct a greater percentage of fluid pressure to said servos as the rotational speed of said input shaft increases.

3. A control system as in claim 1 including a main control valve arrangement disposed between said flow proportioning valve means and said servo members adapted to direct fluid pressure to one or more of said servo members.

4. A control system as in claim 1 including a main control valve arrangement disposed between said pressure source and said flow proportioning valve means adapted to direct fluid pressure to one or more of said servo members.

5. An automatic hydraulic transmission including an input shaft, an output shaft, a fluid pressure source driven by said input shaft, a plurality of fluid pressure responsive servo members for determining the drive condition of said transmission, a sump adapted to supply hydraulic fluid to said fluid pressure source, a flow proportioning valve means disposed between said fluid pressure source and said servo members in communication with a manifold pressure source and said sump, said flow proportioning valve means operative to vary the fluid flow from said fluid pressure source between said servo members and said sump in relation to said manifold pressure, said flow from said pressure source to said servo members increasing as manifold vacuum pressure decreases, and means for providing a governor pressure which varies directly with the rotational speed of said output shaft and means connecting said governor pressure to said flow proportioning valve means whereby, when said output shaft has reached a predetermined rotational speed, said governor pressure overrides the effect of said manifold vacuum pressure to allow substantially all of said fluid pressure to be directed from said fluid pressure source to said servo members.

6. An automatic hydraulic transmission as in claim 5 including a fluid passage defined internal to said flow proportioning valve means in communication with said pressure source operative to urge said flow proportioning valve toward a closed position so as to direct a greater percentage of fluid pressure to said servos as the rotational speed of said input shaft increases.

7. An automatic hydraulic transmission as in claim 5 including a main control valve arrangement disposed between said flow proportioning valve means and said servo members adapted to direct fluid pressure to one or more of said servo members.

8. An automatic hydraulic transmission as in claim 5 including a main control valve arrangement disposed between said pressure source and said flow proportioning valve means adapted to direct fluid pressure to one or more of said servo members.

* * * * *